ated under 35

(12) United States Patent
Sharma

(10) Patent No.: US 7,089,584 B1
(45) Date of Patent: Aug. 8, 2006

(54) SECURITY ARCHITECTURE FOR INTEGRATION OF ENTERPRISE INFORMATION SYSTEM WITH J2EE PLATFORM

(75) Inventor: Rahul Sharma, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/578,346

(22) Filed: May 24, 2000

(51) Int. Cl.
*H04L 9/00* (2006.01)
*H04L 9/32* (2006.01)
*G06F 15/16* (2006.01)
*G06K 9/00* (2006.01)

(52) U.S. Cl. .............................. 726/4; 726/12; 726/26; 713/166; 713/183; 713/193; 709/203; 709/217; 709/225

(58) Field of Classification Search ................ 713/201, 713/155, 167
See application file for complete search history.

(56) References Cited

U.S. PATENT DOCUMENTS 5,586,260 A * 12/1996 Hu .............................. 713/201

OTHER PUBLICATIONS

Lai et al. "User authentication and authorization in the Javaplatform" Computer Security Applications Conference, 1999.
Welch et al. "Supporting real world security models in Java" Distributed Computer Systems, 1999.

* cited by examiner

*Primary Examiner*—Gilberto Barron, Jr.
*Assistant Examiner*—A. Nobahar
(74) *Attorney, Agent, or Firm*—Martine Penilla & Gencarella, LLP

(57) ABSTRACT

A standard for security management in a client server computer system is disclosed. In one aspect, the present invention specifies a security contract between an application server and a resource adapter, supporting access to an enterprise information system by passing a connection request from the resource adapter to the application server, propagating a a security context from the application server to the resource adapter. The security contract includes a subject class representing a grouping of related information for a single entity, and security-related attributes of the subject class.

6 Claims, 7 Drawing Sheets

SECURITY ARCHITECTURE FOR INTEGRATION OF ENTERPRISE INFORMATION SYSTEM WITH J2EE PLATFORM

FIELD

The present invention specifies a security architecture for integration of enterprise information systems with the Java 2 Platform, Enterprise Edition platform (J2EE). The security architecture adds enterprise information system integration specific security details to the security requirements that have been specified in other J2EE specifications.

BACKGROUND

An enterprise depends critically on the information in its enterprise information system (EIS) for its business activities. Any loss or inaccuracy of information or any unauthorized access to EIS can be extremely costly to an enterprise. An EIS can be protected against such security threats using mechanisms that include identifying and authenticating principals; performing authorization and access control to determine whether a principal is allowed to access an application server and/or an EIS; and provide secure communication between an application server and EIS. Communication over insecure links can be protected using a protocol (for example, Kerberos) that provides authentication, integrity and confidentiality services. Communication can also be protected by using a secure links (for example, SSL).

A principal is an entity that can be authenticated by an authentication mechanism that is deployed in an enterprise. A principal is identified using a principal name and authenticated using authentication data. The content and format of the principal name and the authentication data depend upon the authentication mechanism.

A set of security attributes are typically associated with a principal. These security attributes are related to the authentication and authorization mechanisms. Examples include security role and permissions (for security principals) and credentials for a principal. A credential contains or references security information that can authenticate a principal to additional services. A principal acquires a credential upon authentication or from another principal that allows its credential to be used (principal delegation). An end user is an entity (human or service) that acts as a source of a request to an application. An end user is represented as a Subject as specified in the Java Authentication and Authorization Service (JAAS) framework.

An initiating principal is an end user who interacts directly with the application. An end user can authenticate using either a web client or an application client. A caller principal is a principal that is associated with an application component instance during a method invocation. A resource principal is a security principal under whose security context a connection to an EIS instance is established. A security domain is a scope within which certain common security mechanisms and policies are established. An enterprise can contain more than one security domain. Thus an application server and an EIS may be in same or different security domains. In a managed environment, application components are deployed in web or EJB containers. When a method gets invoked on a component, the principal associated with the component instance is termed as a caller principal.

An application component requests a connection to an EIS instance under the security context of a resource principal. The relationship between a resource principal and its attributes to a caller or initiating principal depend on how principal delegation has been configured in an operational environment.

The creation of a new physical connection requires a sign on to an EIS instance. A change of the security context on an existing physical connection can also require EIS sign on; the latter is termed as re-authentication. An EIS sign-on typically determines a resource principal under whose security context a physical connection to an EIS will be established. An EIS sign-on also authenticates a resource principal if it is not already authenticated, establishes a secure association between the application server and the EIS; and performs access control to EIS resources.

Various scenarios exist for EIS integration. These scenarios focus on security aspects of transactions. A J2EE application is a multi-tier, web-enabled application that accesses EISs. It consists of one or more application components—enterprise java beans (EJBs), java server pages (JSPs), servlets—which are deployed on containers. These containers can be web containers that host JSP, servlets, and static hypertext markup language (HTML) pages. Containers can also be EJB containers that host EJB components, as well as application client containers that host stand alone application clients. In the following scenarios, the description of the architecture and security environments are illustrative in scope.

FIG. 1A illustrates an application where a merchant maintains a portal on the world wide web (web) or other computer network where customers may access the portal and purchase products offered by the merchant. Such a portal is referred to herein as an eStore. Company A has an eStore application based on the J2EE platform. The eStore application is composed of EJBs and JSP/servlets; together they collaborate to provide the overall functionality of the application. The application also utilizes an eStore database to store data related to a product catalog; shopping carts functions, customer registration and profiles, transaction status and records, and order status.

A customer, using a web browser, initiates an e-commerce transaction with the eStore application. The e-commerce transaction consists of a series of customer actions. A customer typically browses the online catalog, selects products for purchase, associates the selected products with a shopping cart function, enters a user name and password to initiate a secure transaction, supplies order-related information, and places an order.

To support this e-commerce scenario, the system administrator of the merchant's portal configures a unique security domain (with specific security technology and security policies) for the eStore application. A firewall protects this security domain from unauthorized Internet access. The security domain configuration for the eStore application includes secure web access to the eStore application. Secure web access is set up based on the requirements specified in the J2EE specification.

The system administrator sets up a database to manage persistent data for the eStore application. In terms of security, the database system is configured with an independent security domain. This domain has its own set of user accounts, plus its own security policies and mechanisms for authentication and authorization. The system administrator creates a unique database account (EStoreUser) to handle database transactions. The database transactions correspond to different customer driven interactions with the eStore application. The administrator also sets up an additional database account (EStoreAdministrator) to manage the database on behalf of the eStore administrator. This administrative account has a higher level of access privileges. To facilitate better scaling of the eStore application, the system administrator can choose to set the load balancing of database operations across multiple databases. He can also partition persistent data and transactions across multiple database accounts, based on various performance optimization criteria.

Deployment

During the deployment of the eStore application, the deployer sets up access control for all authenticated customer accounts—the customer accounts that are driving e-commerce transactions over the web based on a single role eStoreUserRole. The deployer configures the resource adapter with the security information that is required for the creation of database connections.

This security information is the database account StoreUser and its password. The deployer sets up the principal mapping for accessing the database system. The deployment configuration ensures that all database access is always performed under the security context of the database account EStoreUser. This database account is called Resource Principal. All authenticated customers (referred to as Initiating Principal) map to a single EstoreUser database account. The eStore application uses an implementationspecific mechanism to tie database transactions (performed under a single database account) to the unique identity (social security number or eStore account ID) of the initiating principal. To ensure that database access has been properly authorized, the eStore application also performs access control based on the role of the initiating principal. Because all initiating principals map to a single role, this is in effect a simple case. This scenario describes an n to 1 mapping, where n can be any number. However, depending on the requirements of an application, the deployer can set the principal mapping to be different from an n to 1 mapping. For example, the deployer can map each role to a single resource principal, where a role corresponds to an initiating principal. This results in a mapping of [m principals and n roles] to [n resource principals] where m>=n. When doing such principal mapping, the deployer has to ensure not to compromise the access rights of the mapped principals.

FIG. 1B shows an employee self service application. Company B has developed and deployed an employee self service (ESS) application based on the J2EE platform. This application supports a web interface to the existing Human Resources (HR) applications, which are supported by the ERP system from Vendor X. The ESS application also provides additional business processes customized to the needs of Company B. The application tier is composed of EJBs and JSPs that provide the customization of the business processes and support a company standardized web interface.

The ESS application enables an employee (under the roles of Manager, HR manager, and Employee) to perform various HR functions, including personal information management, payroll management, compensation management, benefits administration, travel management, and HR cost planning.

The information services (IS) department of Company B has deployed its HR ESS application and ERP system in a secure environment on a single physical location. Employees of the organization are permitted access to the HR application. Access is based on the employee's roles and access privileges. In addition, access to the application can only be from within the organization's intranet.

To support the various interaction scenarios related to the ESS application, the system administrator sets up an end to end Kerberos based security domain for this application environment. The system administrator configures the security environment to support single sign-on; the user logs on only once and can then access all the services provided by the ESS application and its underlying ERP system. Single sign on is achieved through the security mechanism and policies specific to the underlying security technology, which in this case is Kerberos. The ERP system administrator configures all legal employees as valid user accounts in the ERP system.

The administrator sets up various roles (Manager, HRManager, and Employee), default passwords, and access privileges. This security information is kept synchronized with the enterprise wide directory service, which is used by Kerberos to perform the initial authentication of endusers.

During deployment of the ESS application, the deployer sets a default delegation policy of client impersonation for EIS sign-on. In this case, the application server and ERP system know that it is the initiating principal accessing their respective services and they perform access control based on this knowledge. In this scenario, both the initiating principal and the resource principal refer to the same principal. This common principal is authenticated using Kerberos and its Kerberos credentials are valid in the security domains of both the application and the ERP system. The deployer sets up access control for all authenticated employees (initiating principal) based on the configured roles—Manager, HR Manager, and Employee. If the ERP system does not support Kerberos, then an alternate scenario is utilized. The deployer or application server administrator sets up an automatic mapping of Kerberos credentials (for the initiating principal) to valid credentials (for the same principal) in the security domain of the ERP system. Note that when the ERP system does support Kerberos, the application server performs no credentials mapping.

An employee initiates an initial login to his client desktop. He enters his user name and password. As part of this initial login, the employee gets authenticated with Kerberos KDC. After a successful login, the employee starts using his desktop environment. He directs his web browser to the URL for the ESS application deployed on the application server. At this point, the initiating principal C authenticates itself to the application server and establishes a session key with the application server. The ESS application is set up to impersonate initiating principal C when accessing the ERP system, which is running on another server.

Though the application server directly connects to the ERP system, access to the ERP system is requested on behalf of the initiating principal. For this to work, principal C needs to delegate its identity and Kerberos credential to the application server and allow the application server to make requests to the ERP system on C's behalf.

In FIG. 1C, Company C has an integrated purchasing application that enables an employee to use a web-based interface to perform multiple purchasing transactions. An employee can manage the entire procurement process, from creating a purchase requisition through invoice approval. The purchasing application also integrates with the enterprise's existing financial applications so that the accounting and financial aspects of the procurement business processes can be tracked.

Applications such as in FIG. 1C were developed and deployed based on the J2EE platform and are composed of EJBs and JSPs. The EJB components provide the integration across the different applications—the logistics application from a separate vendor (this application provides integrated purchasing and inventory management functions) and the financial accounting applications (the applications supported by the legacy system from vendor Y).

Company C is typically a large, decentralized enterprise with geographically distributed business units and departments. In this scenario, different IS departments manage ERP system X and legacy system Y. In addition, ERP system X and legacy system Y can be deployed at secured data centers in different geographic locations. Lastly, the integrated purchasing application has been deployed at a geographic location different from both ERP system X and legacy system Y.

ERP system X and legacy system Y can also be in different security domains, use different security technologies and have their own specific security policies and mechanisms. The integrated purchasing application is deployed in a security domain that is different from both that of ERP system X and legacy system Y. To support the various interaction scenarios for this integrated purchasing application, the ERP system administrator creates a unique account LogisticsAppUser in the ERP system, utilizing a password and specific access rights for this account. This user account is allowed access only to the logistics business processes that are used by the integrated purchasing application. Likewise, the system administrator for the legacy system creates a unique account FinancialAppUser. He also sets up the password and specific access rights for this account. The application server administrator, as part of the operational environment of the application server, configures the access to an organization wide directory. This directory contains security information (name, password, role, and access rights) for all the employees in the organization. It is used for authentication and authorization of employees accessing the purchasing application. Due to their physical separation in this scenario, EISs X and Y are accessed over either a secure private network or over the Internet. This requires that a secure association be established between the application server domain and the EISs. The application server establishes the secure association for a principal by initially authenticating the principal to the target EIS domain. It then propagates the resulting credentials of the authenticated principal to the EIS, and establishes a shared security context, such that data integrity and confidentiality mechanisms can protect the data integrity of messages between the application server and the EIS.

As illustrated and explained above, there are numerous details involved in security management for a wide spectrum of application scenarios. Currently, there is no standard available to multiple applications. This makes security management a labor intensive aspect of application development, with many nearly similar details being customized for individual applications. For developers working on numerous applications, the lack of security standards results in duplicated effort and inefficient expenditure of resources.

SUMMARY

The present invention addresses the problems above by providing a security architecture that extends the end-to-end security model for J2EE based applications to include integration with EISs based on a connector architecture. The security architecture of the present invention supports authentication and authorization of users who are accessing EISs, keeps security architecture technology neutral and enables a specified security contract to be supported by various security technologies. Additionally, the security architecture of the present invention supports a range of EISs with different levels of security support and existing security environments, as well as the security configuration of a resource adapter in an operational environment.

The security architecture of the present invention also maintains transparency between the security model for connector based EIS integration and an application component provider. This includes providing support for single sign on across multiple EISs.

DETAILED DESCRIPTION

Figure 1A:
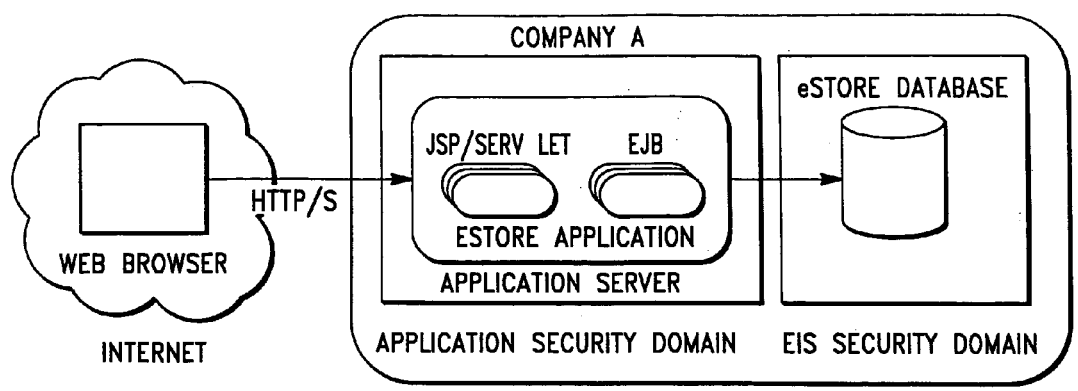
FIGS. 1A, 1B, and 1C illustrate well known EIS system integrations.
Figure 1B:
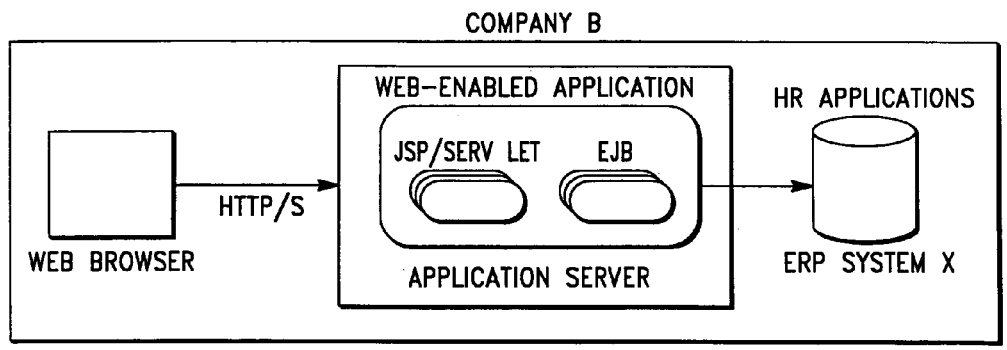
Figure 1C:
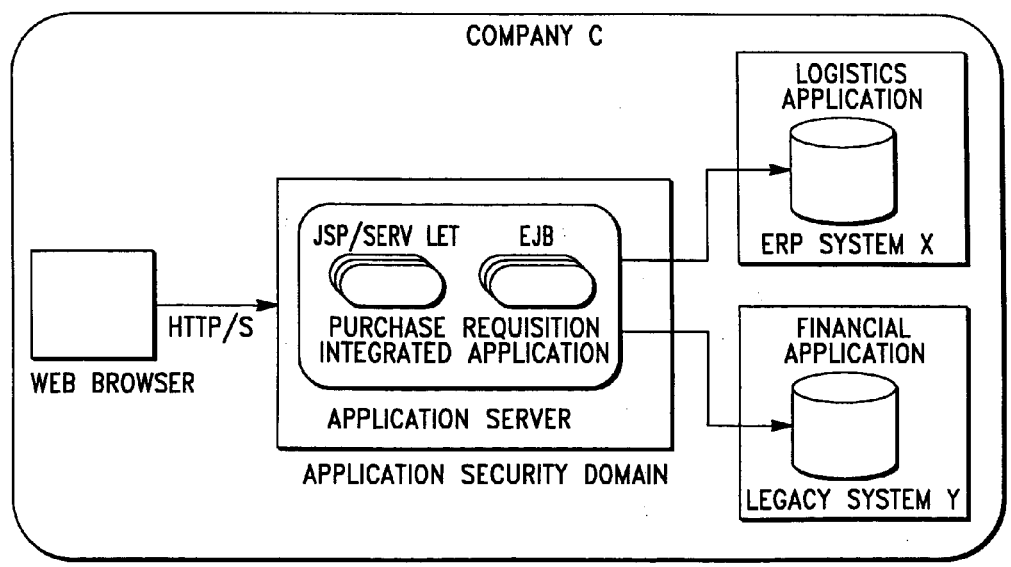
Figure 2:
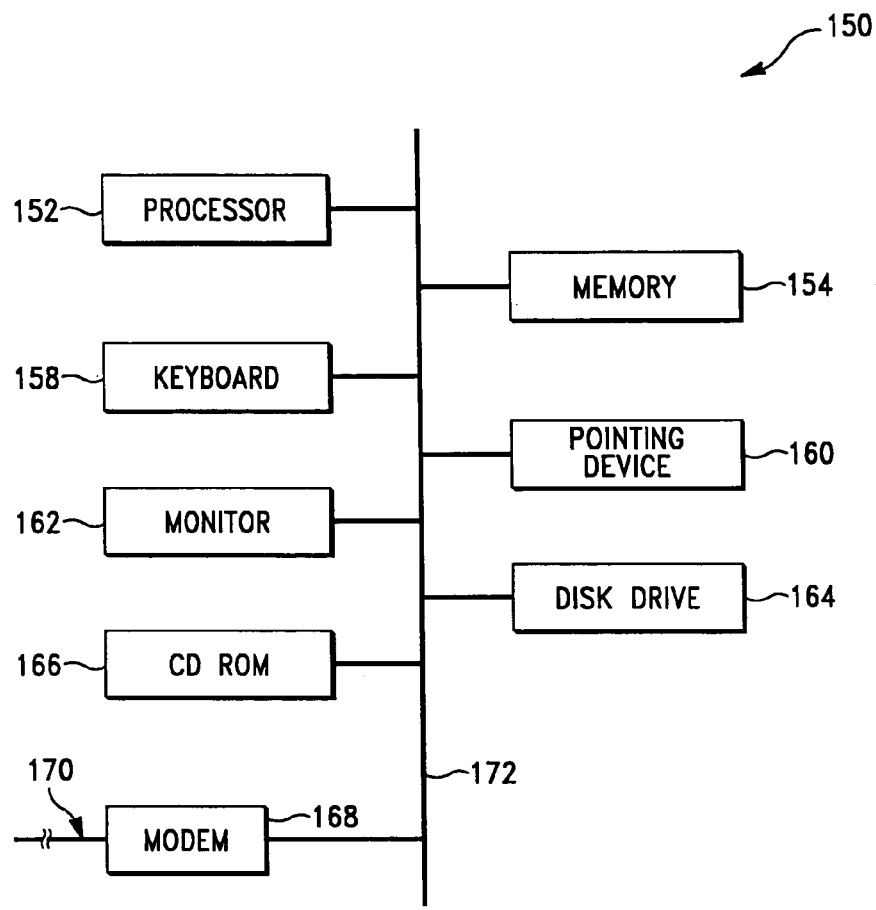
FIG. 2 is a high level block diagram of the hardware components used in connection with the present invention.
Figure 3:
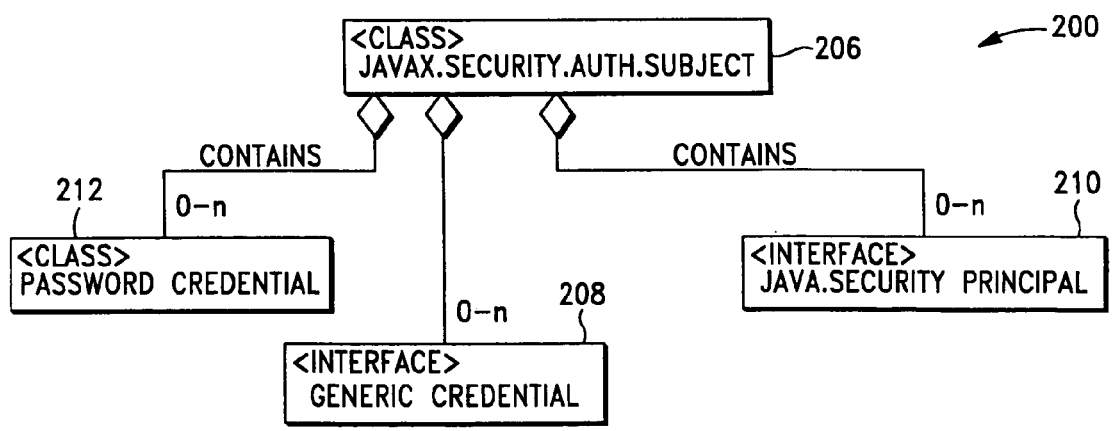
FIG. 3 illustrates the interfaces incorporated in an embodiment of the present invention.
Figure 4:
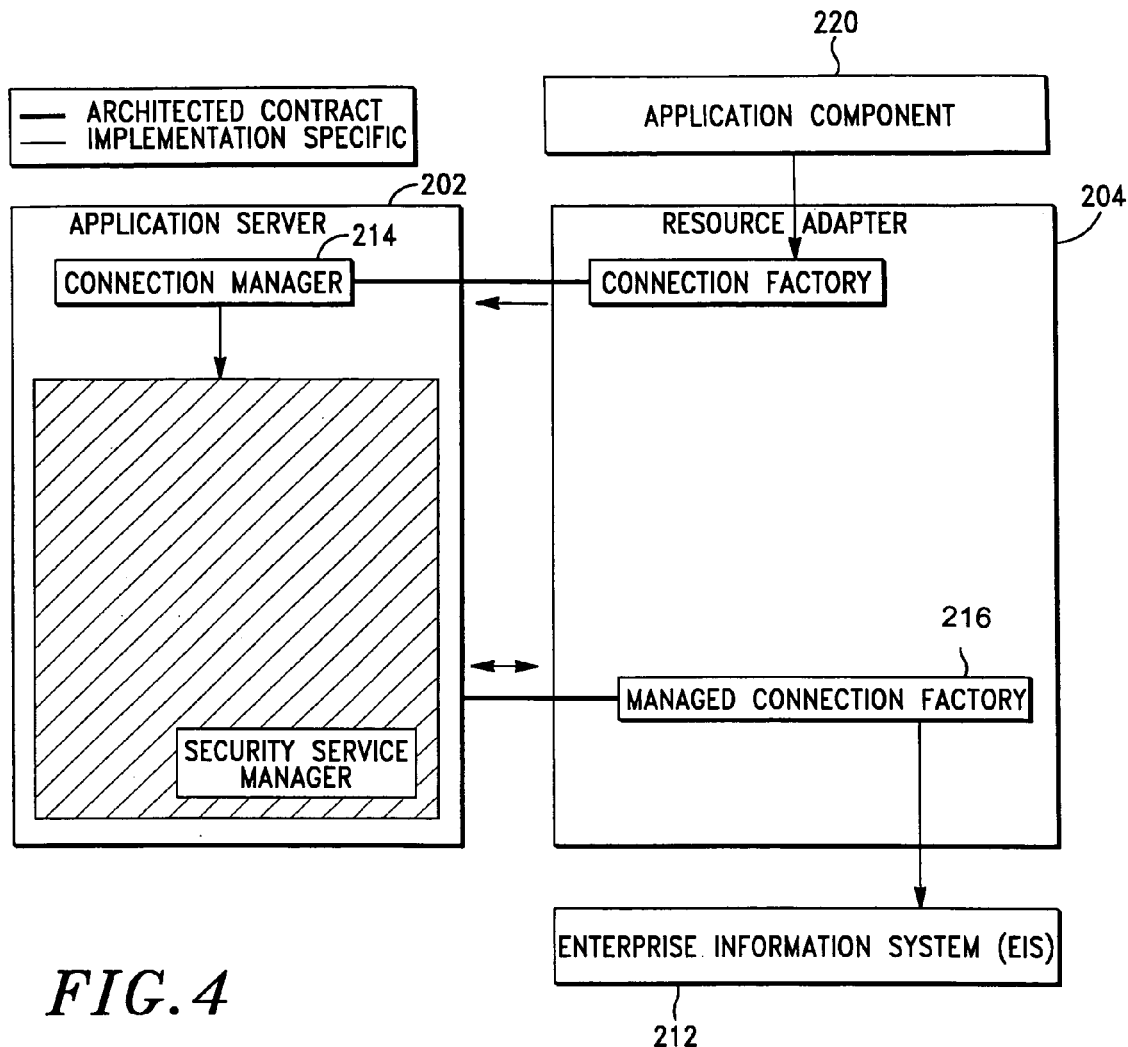
FIG. 4 illustrates the major functional components interfaced by an embodiment of the present invention.

FIG. 2 is a high level block diagram of the hardware typically used in an embodiment of the present invention. Computer 150 incorporates a processor 152 utilizing a central processing unit (CPU) and supporting integrated circuitry. Memory 154 may include RAM and NVRAM such as flash memory, to facilitate storage of software modules executed by processor 152, such as the security architecture of the present invention (FIGS. 3 and 4). Also included in computer 150 are keyboard 158, pointing device 160, and monitor 162.

Mass storage devices such as disk drive 164 and CD ROM 166 may also be in computer 150 to provide storage for the security architecture and associated files. Computer 150 may communicate with other computers via modem 168 and telephone line 170 to allow the security system of the present invention to be operated remotely, interact with other users, or utilize files stored at different locations. Other media may also be used in place of modem 168 and telephone line 170, such as a direct connection or high speed data line. The components described above may be operatively connected by a communications bus 172.

Authentication Mechanism

An application server and EIS collaborate to ensure that a resource principal that establishes a connection to an underlying EIS has been properly authenticated. The connector architecture identifies commonly supported authentication mechanisms such as basic user password based authentication mechanism that is specific to an EIS and Kerberos-based authentication mechanisms. An auth-mech-type element is used in the deployment descriptor to specify whether or not a resource adapter supports a specific authentication mechanism.

Principal Delegation

When an application component requests a connection from a resource adapter, the connection request is made under the security context of a resource principal. The relationship of a resource principal and its security attributes to an initiating/caller principal depends on how resource principal has been setup by the system administrator or deployer. The deployer can set a resource principal based on no-delegation: In this case, a resource principal has its own identity and security attributes independent of the identity of an initiating/caller principal.

A deployer can also set a resource principal based on impersonation. In this case, a resource principal acts on behalf of an initiating/caller principal.

Acting on behalf of a caller principal requires that the caller's identity and credentials be propagated or delegated to the resource adapter and EIS. The mechanism by which this is accomplished is specific to a security mechanism and application server implementation. In some scenarios, a caller principal can be a delegate of an initiating principal. In this case, a resource principal transitively impersonates an initiating principal. A principal delegation mechanism is typically specific to a security mechanism. For example, Kerberos supports mechanism for the delegation of authentication.

An application server can also support a credentials mapping mechanism. This mechanism may be required when an application server and EIS support different authentication domains. For example, the initiating principal has been authenticated and has public key certificate based credentials. The security environment for the EIS is configured with Kerberos based authentication service. The application server is configured to map the public key certificate based credentials associated with the initiating principal to the Kerberos credentials for the resource principal. In the case of credential mapping, the mapped resource principal has the same identity as the initiating/caller principal.

Authorization Model

Authorization checking to ensure that a principal has access to an EIS resource can be applied at either the EIS or the application server, or both. Authorization checking at the target EIS can be done in an EIS specific way and is not specified here. For example, an EIS can define its access control policy in terms of its specific security roles and permissions. Authorization checking can also be done at the application server level. For example, an application server can allow a principal to create a connection to an EIS only if the principal is authorized to do so. J2EE containers (such to create a connection to an EIS only if the principal is authorized to do so. J2EE containers (such as EJB and Servlet containers) support both programmatic and declarative security that can be used to define authorization policies.

The communication between an application server and an EIS can be subject to security threats (for example, data modification, loss of data). Such threats can be countered by establishing a secure association.

A secure association is a shared security information that allows a component on the application server to communicate securely with an EIS. The establishment of a secure association can include several steps: 1) the resource principal is authenticated to the EIS; and may require that the target principal in the EIS domain authenticate itself back to the application server. A target principal can be setup by the system administrator as a security principal associated with a running EIS instance or specific EIS resource. 2) negotiating a quality of protection, such as confidentiality or integrity. 3) a pair of communicating entities—application server and EIS instance—establish a shared security context using the credentials of the resource principal. The security context encapsulates shared state information, which is required such that communication between the application server and EIS can be protected through integrity and confidentiality mechanisms. Examples of shared state information as part of a security context are cryptographic keys and message sequence numbers. A secure association between an application server and an EIS is always established by the resource adapter implementation. Note that a resource adapter library runs within the address space of the application server. Once a secure association is established successfully, the connection gets associated with the security context of the resource principal. Subsequently, all application level invocations to the EIS instance using the connection happen under the security context of the resource principal.

Application Component Provider

While developing and deploying application components, an application component provider follows one of the security models specified in the J2EE component model specifications: EJB, JSP or Servlet specification. For example, the EJB specification specifies the requirements for a bean provider and application assembler to support security model for EJB components. The following features are common across different J2EE component models from the perspective of an application component provider: 1) application component provider invariably keeps away from the burden of securing its application and focuses on developing the business functionality of its application. 2) security aware application component provider can use a simple programmatic interface to manage security at an application level. The programmatic interface enables an application component provider to program access control decisions based on the security context, principal, and/or role associated with the caller of a method and to manage programmatic sign-on to an EIS. 3) application component provider specifies security requirements for its application declaratively in a deployment descriptor. The security requirements include security roles, method permissions and authentication approach for EIS sign-on. 4) more qualified roles— application server vendor, connector provider, deployer, system administrator—take the responsibility of satisfying overall security requirements (as specified in deployment descriptors of resource adapter and components) and managing the security environment.

An application component requests a connection to be established under the security context of a resource principal. The security context includes security attributes—role, access privileges, authorization level for a resource principal. Once a connection is established successfully, the connection gets associated with the security context of the resource principal.

Subsequently, all application level invocations to the EIS instance using the connection happen under the security context of the resource principal.

An application component provider has the following two choices related to EIS sign-on: 1) application component provider allows the deployer to set up principal delegation and EIS sign-on information. For example, the deployer sets user name and password for establishing a connection to an EIS instance. 2) application component provider signs on to an EIS from the component code by providing explicit security information for a resource principal. An application component provider uses a deployment descriptor element (example: res-auth for EJB components) to indicate requirement for one of the above two approaches. For example, if the res-auth element is set to component, the component code performs a programmatic sign-on to the EIS; if the res-auth element is container, the application server takes the responsibility of setting up and managing EIS sign-on.

Container Managed Sign-On Scenario

The application component provider sets the res-auth deployment descriptor element to be container letting the application server take the responsibility of managing EIS sign-on. The deployer sets up the principal mapping such that the user account for connecting to the EIS instance is always eStoreUser. The deployer also configures the authentication data that is needed to authenticate eStoreUser to the EIS. The component code invokes the getConnection method on the ConnectionFactory instance with no security related parameters. The component relies on the application server to manage sign-on to the EIS instance based on the security information configured by the deployer. The following code segment is an illustrative example.

```
// Method in an application component
Context initctx=new InitialContext( );
// perform JNDI lookup to obtain connection factory
Context initctx=new InitialContext( );
// perform JNDI lookup to obtain connection factory
javax.resource.cci.ConnectionFactory cxf=
(javax.resource.cci.ConnectionFactory)initctx.lookup(
"java:comp/env/EIS/MyEIS");
// Invoke factory to obtain a connection. The security
// information is not passed in the getConnection method
javax.resource.cci.Connection cx=cxf.getConnection( );
. . .
```

Component Managed Sign-On Scenario

The application component provider sets the res-auth element to be component. The component code performs a programmatic sign-on to the EIS.

The application component passes explicit security information (username, password) to the getConnection method of the ConnectionFactory instance.

```
// Method in an application component
Context initctx=new InitialContext( );
// perform JNDI lookup to obtain connection factory
javax.resource.cci.ConnectionFactory cxf=
(javax.resource.cci.ConnectionFactory)initctx.lookup(
"java:comp/env/EIS/MyEIS");
// Invoke factory to obtain a connection
java.util.Map properties=// .. create a new Map
properties.put("UserName", " . . . ");
properties.put("Password", " . . . ");
javax.resource.cci.Connection cx=cxf.getConnection(properties);
```

Application Server

The application server provides a security environment (with specific security policies and mechanisms) that support the security requirements of deployed application components and resource adapters; thereby ensuring a secure access to connected EISs. The application server can provide tools to setup security information for EIS sign-on when res-auth element is set to container. The minimum requirement is to support user/password based authentication during EIS sign-on. The application server can provide principal delegation mechanism so that initiating/caller principal can be propagated (directly or through mapping) to an underlying EIS.

The security mechanisms and policies required for supporting principal delegation are outside the scope of the connector architecture. These mechanisms and policies are typically specific to a security technology and application server. The application server can provide tools to support management and administration of its security domain. For example, security domain administration can include setting up and maintaining underlying authentication services, setting up and maintaining trusts between domains and managing principals (including identities, keys, attributes) as required by the security technology.

The application server can support a single sign-on mechanism that spans across application server and multiple EISs. The security mechanisms and policies through which single sign-on is achieved are outside the scope of the connector architecture.

EIS Vendor

An EIS provides security infrastructure and environment that supports the security requirements of the client applications.

An EIS can have its own security domain with a specific set of security policies and mechanisms or it can be setup as part of an enterprise-wide security domain.

Connector Provider

The resource adapter is required to implement the security contract specified as part of the connector contracts. The resource adapter is required to specify its security capabilities and requirements through its deployment descriptor.

Deployer

The deployer specifies security policies that ensure secure access to the underlying EISs from application components. The deployer adapts the intended security view of an application for EIS access, as specified through a deployment descriptor, to the actual security mechanisms and policies used by the application server and EISs in the target operational environment. The deployer uses tools to accomplish above task. The output of the deployer's work is a security policy descriptor that is specific to the operational environment. The format of the security policy descriptor is specific to an application server.

The deployer performs the following deployment tasks for each connection factory reference (element resource-ref) declared in the deployment descriptor of an application component: 1) provide connection factory specific security configuration that is needed for opening and managing connections to an EIS instance. 2) bind the connection factory reference in the deployment descriptor of an application component to the JNDI registered reference for the connection factory. The deployer can use JNDI LinkRef mechanism to create a symbolic link to the actual JNDI name of the connection factory. 3) set up principal mapping and delegation options for EIS sign-on. If principal mapping from the security domain used at the application server level to the security domain of the EIS is needed, the deployer is responsible for setting up the principal mapping.

The principal mapping is performed in an application server specific way and is beyond the scope of the current specification. 4) if the value of the res-auth deployment descriptor element is container, the deployer is responsible for configuring the security information for EIS sign-on. The minimum requirement is that the deployer be able to specify user/password based security information for each connection factory reference as declared by an application component.

System Administrator

The system administrator typically works in close association with administrators of multiple EISs that have been deployed in an operational environment. The system administration tasks can also be performed by the deployer. The system administrator adds, removes and configures resource adapters in the application server environment. The security domain administration is outside the scope of the connector specification. The system administrator undertakes specific security tasks to setup an operational environment. These system administration tasks can be based on the technology and requirements of authentication service and whether an enterprise directory is supported or not. For example, the system administrator can establish a trust delegation for the application server to access EIS if Kerberos is being used as an enterprise-wide authentication service.

If the enterprise-wide security infrastructure supports an enterprise directory, the system administrator can configure the user account information for both the application server and EIS in the enterprise directory. The account information maintained in the enterprise directory is used for authentication of users requesting connectivity to the EIS. When an EIS is plugged in to an application server, the system administrator can establish a password synchronization mechanism between the application server and the EIS. This ensures that the user's security information is maintained identical on the application server and EIS.

When EIS requires authentication, application server passes the user's password to the EIS.

Security Contract

Directing attention to FIGS. 3 and 4, the security contract 200 between the application server 202 and resource adapter 204 extends the connection management contract by adding security specific details. This security contract 200 supports EIS sign-on by passing the connection request from the resource adapter 204 to the application server 202 and enabling latter to hook-in security services. The security contract 200 also provides for propagation of security context (JAAS Subject, its principals and credentials) from the application server 202 to the resource adapter 204. The security contract 200 includes the following classes and interfaces: subject 206, generic credential, password credential, connection manager, managed connection factory, and managed connection.

Subject 206 represents a grouping of related information for a single entity, such as a person. Such information includes the subject 206's identities as well as its security related attributes (for example, passwords and cryptographic keys). Subject 206 can have multiple identities. Each identity is represented as a principal within the subject 206. A principal simply binds a name to subject 206. Subject 206 may also own security related attributes, which are referred to as credentials. Sensitive credentials that require special protection, such as private cryptographic keys, are stored within a private credential set. The credentials intended to be shared, such as public key certificates or Kerberos server tickets, are stored within a public credential set. Different permissions are required to access and modify different credential sets. The getPrincipals method is used to retrieve all the principals associated with subject 206. The methods getPublicCredentials and getPrivateCredentials are used respectively to retrieve all the public or private credentials belonging to Subject 106. The methods defined in the set class are used to modify the returned set of principals and credentials.

The interface java. security. Principal 210 is used to represent a resource principal. The following code extract is an illustrative example showing the principal interface:
public interface java.security.Principal {
public boolean equals(Object another);
public String getName( );
public String toString( );
public int hashcode( );
}

The method getName returns the distinguished name of a resource principal. An application server 202 should use an implementation of the principal interface to pass a resource principal as part of subject 206 to a resource adapter 204. The interface javax. resource. spi. security. GenericCredential defines a security mechanism independent interface for accessing security credential of a resource principal.

The GenericCredential interface 208 provides as a Java wrapper over an underlying mechanism specific representation of a security credential. The GenericCredential interface 208 enables a resource adapter 204 to extract information about a security credential. The resource adapter 204 can then manage EIS sign on for a resource principal. The following code extract example shows the GenericCredential interface 208:
public interface javax.resource.spi.security.GenericCredential
extends java.io.Serializable {
public String getName( );
public String getMechType( );
public byte[ ] getCredentialData( )
throws javax.resource.spi.SecurityException;
public void destroy( )
throws javax.resource.spi.SecurityException;
public boolean equals(Object another);
public int hashCode( );
}

The GenericCredential interface 208 supports a set of getter methods to obtain information about a security credential. The method getName returns the distinct name of the resource principal associated with a GenericCredential instance.

The method getMechType returns the mechanism type for the GenericCredential instance. In the GenericCredential interface 208, the mechanism type is returned as a stringified representation of the OID specification. The GenericCredential interface 208 can be used to get security data for a specific security mechanism. An example is authentication data required for establishing a secure association with an EIS instance on behalf of the associated resource principal. The getCredentialData method returns the credential representation as an array of bytes. When the credential instance is no longer needed, the destroy method can be called to release any resources held by the underlying credential representation and to destroy any sensitive information. If an application server 202 supports deployment of resource adapter 204 that supports GenericCredential as part of the security contract 200, then the application server 202 is required to provide an implementation of GenericCredential interface 208.

The class javax.resource.spi.security.PasswordCredential 212 acts as a holder of username and password. This class enables an application server 202 to pass username and password to the resource adapter 204 through the security contract 200. The method getUserName on PasswordCredential class is used to get the name of the resource principal.

The java. security. Principal interface 210 represents a resource principal. The PasswordCredential class is required to implement equals and hashCode method. The following code segment is an illustrative example.
public final class javax.resource.spi.security.PasswordCredential
implements java.io.Serializable {
public PasswordCredential(String userName, char[ ] password) { . . . }
public String getUserName( ) { . . . }
public char[ ] getpassword( ) { . . . }

```
public ManagedConnectionFactory getManagedConnec-
   tionFactory( )
{ ... }
public void setManagedConnectionFactory(
ManagedConnectionFactory mcf) { ... }
public boolean equals(Object other) { ... }
public int hashcode( ) { ... }
}
```

The method getManagedConnectionFactory returns the ManagedConnectionFactory instance for which the user name and password has been set by the application server 202. The method ConnectionManager.allocateConnection is called by the resource adapter 204's connection factory instance. This enables resource adapter 204 to pass a connection request to the application server 202, so that the latter can hook in security and other services.

```
public interface javax.resource.spi.ConnectionManager {
public Object allocateConnection(
ManagedConnectionFactory mcf,
ConnectionRequestInfo cxRequestInfo)
throws ResourceException;
}
```

Depending on whether application server 202 or application component is configured to be responsible for managing EIS sign-on, the resource adapter 204 should call the ConnectionManager.allocateConnection method in one of several ways. In a container nmaged sgn on scenario, the application component passes no security information in the getConnection method and the application server 202 is configured to manage EIS sign on. The application server 202 provides the required security information for the resource principal through its configured security policies and mechanisms (for example, principal mapping). The application server 202 initiates the authentication of the resource principal to the EIS either itself or passes authentication responsibility to the resource adapter 204.

In a component managed sign-on case, the application component provides explicit security information in the getConnection method. The resource adapter 204 invokes allocateConnection method by passing security information in the ConnectionRequestInfo parameter. Since the security information in the ConnectionRequestInfo is opaque to the application server 202, the application server 202 should rely on the resource adapter 204 to manage EIS sign-on.

The following code extract example shows methods on the ManagedConnectionFactory interface that are relevant to the security contract 200:

```
public interface javax.resource.spi.ManagedCon-
   nectionFactory {
public ManagedConnection createManagedConnection(
javax.security.auth.Subject subject,
ConnectionRequestInfo cxRequestInfo)
throws ResourceException;
...
}
```

During the JNDI lookup, the ManagedConnectionFactory 216 instance is configured by the application server 202 with a set of configuration properties. These properties include the default security information and EIS instance specific information (hostname, port number) that is required for initiating a sign on to the underlying EIS during the creation of a new physical connection. The method createManagedConnection is used by the application server 202 when it requests resource adapter 204 to create a new physical connection to the underlying EIS.

The application server 202 provides various security services (principal mapping and delegation, single sign-on) before using the security contract 200 with the resource adapter 204. For example, the application server 202 can map the caller principal to resource principal before calling the method createManagedConnection to create a new connection (under the security context of the resource principal). The security configuration on the ManagedConnectionFactory 216 acts as a default when the application server 202 passes no security information on a per connection creation request to the resource adapter 204.

The application server 202 has several options for invocation of the method createManagedConnection: Option A: The application server 202 invokes the method createManagedConnection by passing in a non null Subject instance that carries the resource principal and its corresponding password based credential (represented by the class PasswordCredential, which provides the user name and password). The resource adapter 204 extracts the user name and password from this Subject instance (by looking for PasswordCredential instance in the Subject 206) and uses this security information to sign-on to the EIS instance during the connection creation. Option B: The application server 202 invokes the method createManagedConnection method by passing in a nonnull Subject instance that carries the resource principal and its credentials. In this option, credentials are represented through the GenericCredential interface 208. A typical example is a Subject instance with Kerberos credential. For example, an application server can use this option for createManagedConnection method invocation when the resource principal is impersonating the caller/initiating principal and has valid credentials acquired through impersonation. An application server can also use this option for principal mapping scenarios with credentials of a resource principal represented through the GenericCredential interface 208. The resource adapter 204 uses the resource principal and its credentials from the Subject instance to go through the EIS sign-on process before creating a new connection to the EIS. Option C: The application server 202 requests resource adapter 204 to manage the EIS sign-on by passing a null Subject instance. The application server 202 uses this option for the component managed sign on case where security information is carried in the ConnectionRequestInfo instance. The application server 202 does not provide any security information that can be used by the resource adapter 204 for managing EIS sign-on.

Contract for Resource Adapter

Resource adapter 204 can do EIS sign-on and connection creation in an implementation specific way or can use the GSS-API. Resource adapter 204 has several options (corresponding to the options for application server) for handling invocation of the method createManagedConnection. Option A: The resource adapter 204 explicitly checks whether passed Subject instance carries a PasswordCredential instance using the Subject.getPrivateCredentials method.

Note that the security contract 200 assumes that a resource adapter has necessary security permissions to extract private credential Set from a Subject instance. If the Subject instance contains a PasswordCredential instance, the resource adapter 204 extracts the user name and password from the PasswordCredential. It uses the security information to authenticate the resource principal (corresponding to the user name) to the EIS during the creation of a connection. In this case, the resource adapter 204 uses an authentication mechanism that is EIS specific. Since a Subject instance can carry multiple PasswordCredential instances, a ManagedConnectionFactory 216 should only use Password-Credential instance that has been specifically passed for it through the security contract 200. The method getManagedConnectionFactory enables a ManagedConnectionFactory instance to find out whether or not a PasswordCredential instance is to be used for sign-on to the target EIS instance. The ManagedConnectionFactory implementation 216 uses the equals method to compare itself with the passed instance.

Option B: The resource adapter 204 explicitly checks whether passed Subject instance carries a GenericCredential instance using the methods getPrivateCredentials and getPrivateCredentials defined on the Subject 206 interface. Note that sensitive credentials that require special protection, such as private cryptographic keys, are stored within a private credential Set. While credentials intended to be shared, such as public key certificates or Kerberos server tickets, are stored within a public credential Set. The two methods getPrivateCredentials and getPrivateCredentials should be used accordingly. The resource adapter 204 uses the resource principal and its credentials (as represented through the GenericCredential interface) in the Subject instance to go through the EIS sign-on process. For example, this option is used for Kerberos based credentials that have been acquired by the resource principal through impersonation.

Resource adapter 204 uses the getter methods defined on the GenericCredential interface to extract information about the credential and its principal. If a resource adapter is using GSS mechanism, resource adapter 204 uses a reference to the GenericCredential instance in an opaque manner without any requirement to understand any mechanism specific credential representation. However, a resource adapter may need to interpret credential representation if the resource adapter 204 initiates authentication in an implementation specific manner.

Option C: If the application server 202 invokes ManagedConnectionFactory.create-ManagedConnection with a null subject instance, then resource adapter 204 has the following options. Option 1) the resource adapter 204 should extract security information passed through the ConnectionRequestInfo instance. The resource adapter 204 should authenticate resource principal by combining the configured security information on the ManagedConnectionFactory instance with the security information passed through the ConnectionRequestInfo instance. The default for resource adapter 204 is to allow the security information in the ConnectionRequestInfo parameter to override the configured security information in the ManagedConnectionFactory instance. Option 2) if the resource adapter 204 does not find any security configuration in the ConnectionRequestInfo, resource adapter 204 uses the default security configuration on the ManagedConnectionFactory instance.

Resource adapter 204 can reauthenticate a physical connection (one that already exists in the connection pool under a different security context) to the underlying EIS. Resource adapter 204 perfroms reauthentication when application server 202 calls getConnection method with a security context (passed as a Subject instance) that is different from the one previously associated with the physical connection. A support for re-authentication depends on whether an underlying EIS supports reauthentication mechanism for existing physical connections.

In an embodiment where resource adapter 204 does not support reauthentication, then the resource adapter 204 should ignore security information that is passed through the getConnection method.

```
public interface javax.resource.spi.ManagedConnection {
public Object getConnection(
javax.security.auth.Subject subject,
ConnectionRequestInfo cxRequestInfo)
throws ResourceException;
. . .
}
```

The getConnection method returns a new connection handle. If reauthentication is successful, the resource adapter 204 has changed the security context of the underlying ManagedConnection instance to that associated with the passed Subject instance. Resource adapter 204 has the following options for handling ManagedConnection.getConnection invocation if it supports reauthentication. Option A: Resource adapter 204 extracts PasswordCredential instance from the subject 106 and performs an EIS specific authentication. This option is similar to the option A defined in the specification of the method createManagedConnection on the interface ManagedConnectionFactory. Option B: Resource adapter 204 extracts GenericCredential instance from the subject 106 and manages authentication either through GSS mechanism or an implementation specific mechanism. This option is similar to the option B defined in the specification of the method createManagedConnection on the interface ManagedConnectionFactory 216. Option C: In this case, the Subject 106 parameter is null. Resource adapter 204 extracts security information from the ConnectionRequestInfo (if there is any) and performs authentication in an implementation specific manner.

This option is similar to the option C defined in the specification of the method createManagedConnection on the interface ManagedConnectionFactory 216.

The resource adapter 204 is required to support the security contract 200 by implementing the method ManagedConnectionFactory.createManagedConnection. The resource adapter 204 is required to specify its support for the security contract 200 as part of its deployment descriptor. The relevant deployment descriptor elements are authmechanism, authmechtype, reauthentication support and credential interface.

The application server 202 is required to use the method ManagedConnectionFactory.create-ManagedConnection to pass the security context to the resource adapter 204 during EIS sign-on. The application server 202 should be capable of using all three options A, B and C as specified above in the ManagedConnectionFactory description. The application server 202 is required to provide an implementation of GenericCredential interface 208 to support resource adapters that are capable of handling GenericCredential (and thereby option B) as part of the security contract 200. The application server 202 is required to implement the method allocateConnection in its Connection Manager 214 implementation. The application server 202 is required to configure its use of the security contract 200 based on the security requirements specified by the resource adapter 204 in its deployment descriptor. For example, if a resource adapter specifies that it supports only basic password authentication, application server 202 should use the security contract 200 to pass.

Figure 6:
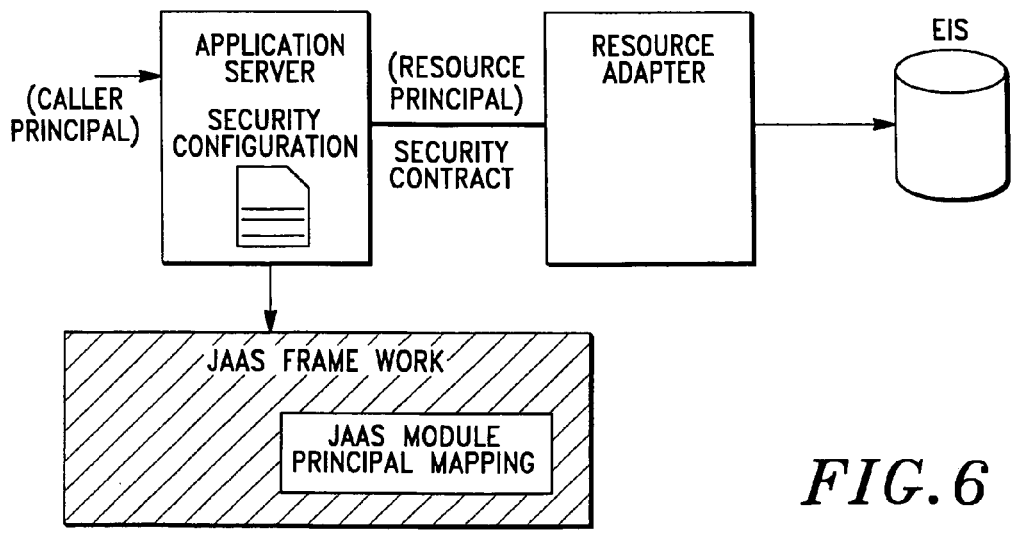
FIGS. 5 & 6 illustrate the major functional components of an alternative embodiment of the present invention.
Figure 5:
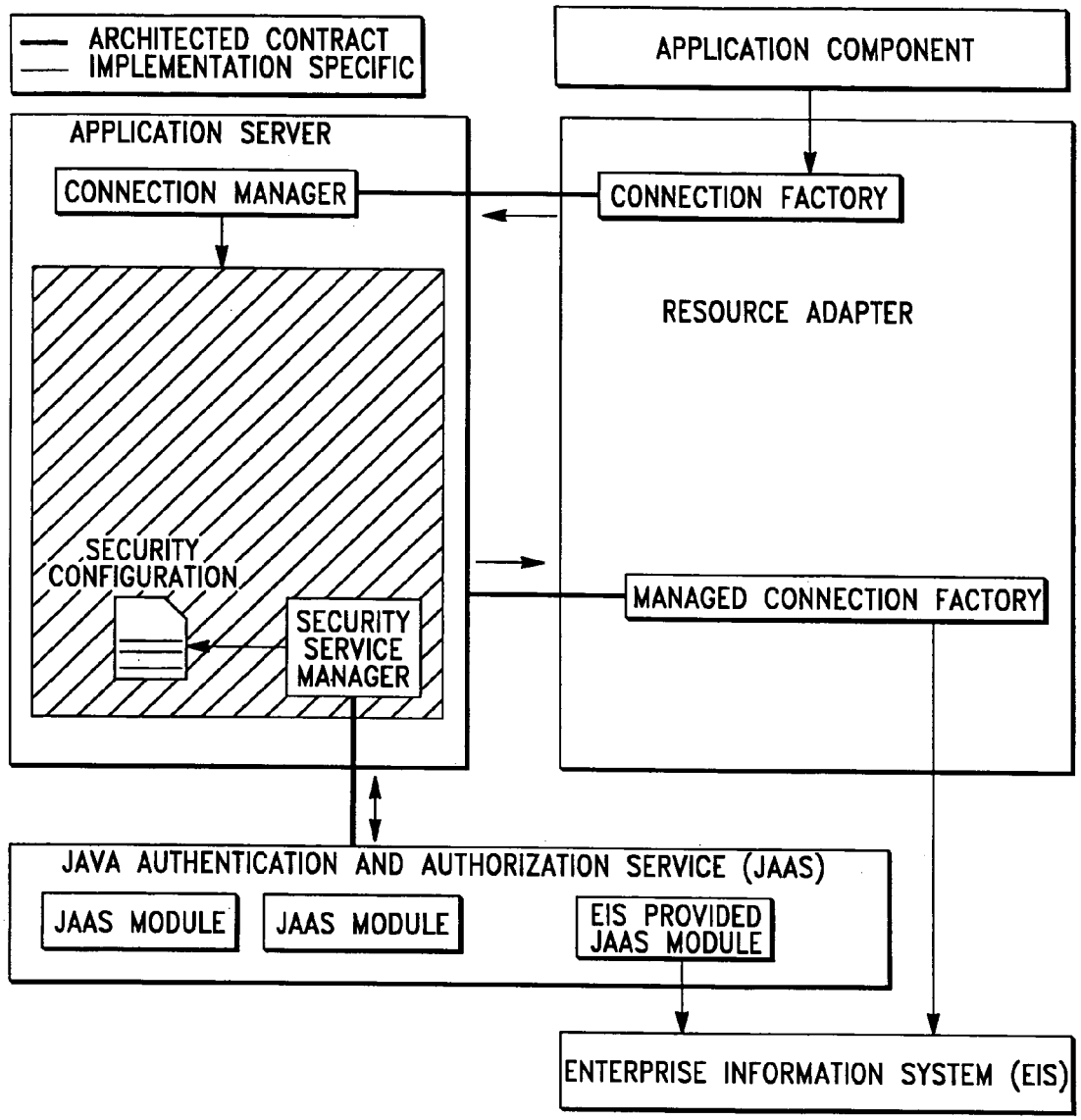

In a different embodiment (FIGS. 5 and 6), the security architecture of the present invention supports JAAS based pluggable authentication. JAAS provides a standard Java framework and programming interface that enables applications to authenticate and enforce access controls upon users. JAAS can be subdivided in to two parts based on the security services provided. The first part is Pluggable Authentication. This part of the JAAS framework allows a system administrator to plug in the appropriate authentication services to meet security requirements of an application environment. There is no need to modify or recompile an existing application to support new or different authentication services. The second part of JAAS deals with authorization. Once authentication has successfully completed, JAAS provides the ability to enforce access controls based upon the principals associated with an authenticated subject. The JAAS principal based access controls (access controls based on who runs code) supplement the existing Java 2 code source based access controls (access controls based on where code came from and who signed it).

The connector security architecture uses JAAS in a Security Contract. A JAAS Subject class is used as part of the security contract between an application server and resource adapter. This use of JAAS interfaces enables security contract to be remain independent of any specific security technology or mechanisms. The security architecture also uses a JAAS Pluggable Authentication framework that enables an application server and its underlying authentication services to remain independent from each other. As more EISs are plugged in and any new authentication services are required (or are upgraded), they can be plugged in an application server without requiring modifications to the application server. The connector architecture requires that application server and resource adapter support JAAS Subject class as part of the security contract. However, it is preferred that an application server use JAAS pluggable authentication framework. The connector architecture does not require support for the authorization part of the JAAS framework.

The security architecture addresses how JAAS should be used by an application server to support authentication requirements of heterogeneous EISs. It is preferable that an application server support platform wide JAAS modules (also called authentication modules) for authentication mechanisms that are common across multiple EISs. The implementation of these JAAS modules is typically specific to an application server. However, these modules can be developed to be reusable across application servers. A connector provider can provide a resource adapter specific custom implementation of JAAS module. A custom JAAS module should be packaged together with a resource adapter and should be pluggable into an application server using the JAAS architecture.

The JAAS specification specifies requirements for developing and configuring JAAS modules. A generic security service (GSS) API is a standard API that provides security services to caller applications in a generic fashion. These security services include authentication, authorization, principal delegation, secure association establishment, per message confidentiality and integrity. These services can be supported by a wide range of security mechanisms and technologies. However, an application using GSS-API accesses these services in a generic mechanism independent fashion and achieves source level portability. In the context of the connector architecture, GSS-API is used by a resource adapter to establish a secure association with the underlying EIS. The use of GSS mechanism by a resource adapter will be typical in the following scenarios: 1) EIS supports Kerberos as a third party authentication service and uses GSS-API as a generic API for accessing security services. 2) resource adapter and EIS need data integrity and confidentiality services during their communication over insecure links.

The GSS-API has been implemented over a range of security mechanisms, which includes Kerberos V5.

During the deployment of a resource adapter, the deployer is responsible for configuring required JAAS modules in the operational environment. The configuration of JAAS modules is based on the security requirements specified by a resource adapter in its deployment descriptor. The element auth-mechanism in the deployment descriptor specifies an authentication mechanism supported by a resource adapter. The standard types of authentication mechanisms are basic password and kerbv5. For example, if a resource adapter specifies support for kerbv5 authentication mechanism, the deployer configures a Kerberos module in the operational environment.

The deployer sets up configuration of JAAS modules based on the JAAS specified mechanism. Refer javax.security.auth.login.Configuration specification for more details. The JAAS configuration includes the following information on a per resource adapter basis: 1) authentication module(s) that should be used to authenticate a resource principal; 2) order in which authentication modules need to invoked during stacked authentication; 3) flag value controlling authentication semantics if stacked modules are invoked during authentication. The format for the above configuration is specific to an application server implementation.

In a resource adapter managed authentication scenario (FIG. 6), the following steps are involved: The application component invokes connection request method on the resource adapter without passing in any security arguments. The resource adapter passes the connection request to the application server. During the deployment of the resource adapter, the application server is configured to use a principal mapping module. This principal mapping module takes a Subject instance with the caller principal and returns a Subject instance with a valid resource principal and PasswordCredential instance. The PasswordCredential has the password for authentication of the resource principal. The application server calls LoginContext.login method.

On a successful return from the principal mapping module, the application server gets a Subject instance that has the mapped resource principal with a valid PasswordCredential. The application server invokes the method ManagedConnectionFactory. createManagedConnection passing in a non-null Subject instance. The Subject instance carries the resource principal and its corresponding PasswordCredential, which holds the user name and password. The resource adapter extracts the user name and password from the PasswordCredential instance. The resource adapter uses the getter methods (getPrivateCredentials method) defined on the Subject interface to extract the PasswordCredential instance. The resource adapter uses username and password information (extracted from the PasswordCredential instance) to authenticate the resource principal to the EIS. The authentication happens during the creation of the connection through an authentication mechanism that is specific to the underlying EIS. This scenario enables the connector architecture to support EIS specific user name/password based authentication.

Figure 7:
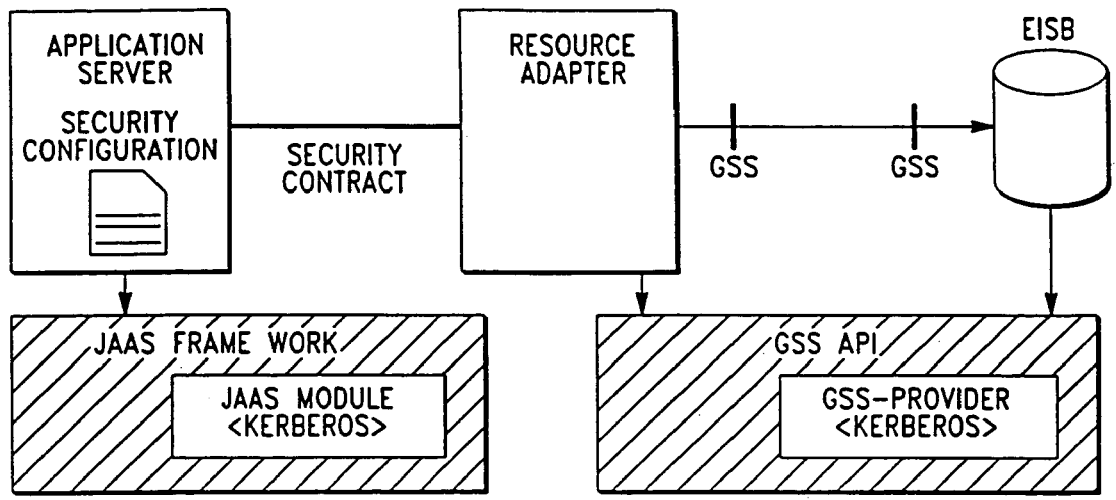
FIGS. 7–12 illustrate various operating scenarios with respect to a JAAS framework incorporated with the alternative embodiments of the present invention.

FIG. 7 illustrates a scenario involving Kerberos and principal delegation and incorporates the following steps: The initiating principal authenticates itself to the application server using Kerberos. The initiating principal has a service ticket for the application server and a TGT (ticket granting ticket issued by the KDC) as part of its Kerberos based credential. The application server is configured to impersonate the initiating principal when accessing the EIS instance. Even though application server is directly connecting to the EIS using the resource principal, access to the EIS is being requested on behalf of the initiating principal. The resource principal impersonates the initiating principal by assuming latter's identity and making requests to EIS on behalf of the initiating principal.

The application server is configured to use the JAAS module for Kerberos. The application server creates a LoginContext instance by passing in the subject instance corresponding to the initiating principal and a CallbackHandler instance. Next, the application server calls the login method on the LoginContext instance. The Kerberos module (called through LoginContext.login method) gets a service ticket for EIS instance. The Kerberos module uses the CallbackHandler mechanism to get necessary information (as required for getting a service ticket) about the target EIS instance from the application server. After a successful return from the Kerberos module, the application server calls the method ManagedConnectionFactory.createManagedConnection by passing in a subject instance with the resource principal and its Kerberos credential. The Kerberos credential is represented through the GenericCredential interface. The resource adapter extracts the resource principal and its Kerberos credential from the Subject instance. The resource adapter creates a new physical connection to the EIS. If the resource adapter and EIS support GSS-API for establishing a secure association, the resource adapter propagates Kerberos credential (now with the service ticket for the EIS) to the EIS instance using the GSS mechanism. If the resource adapter and EIS fail to establish a secure association, the resource adapter cannot use the physical connection as a valid connection to the EIS instance. The resource adapter returns a security exception on the createManagedConnection method.

Figure 8:
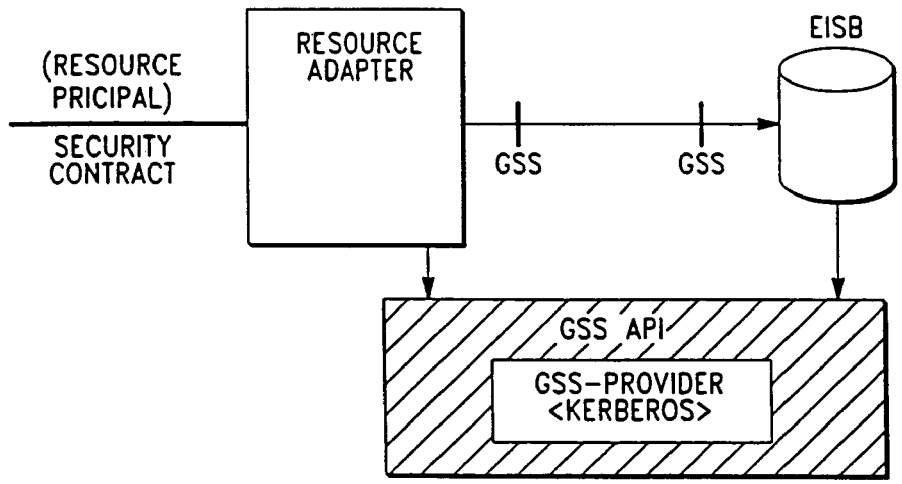
Figure 9:
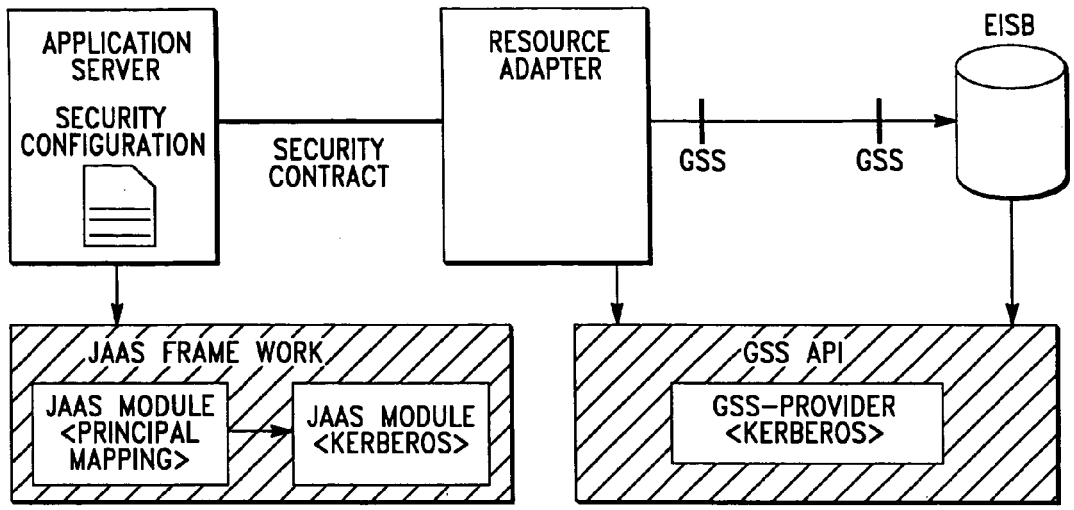

If an EIS supports GSS mechanism, a resource adapter can use GSS-API to set up a secure association with the EIS instance, as shown in FIG. 8. This scenario involves Kerberos authentication after principal mapping. The application server is configured to use the principal mapping module and Kerberos module. The two authentication modules are stacked together with the principal mapping module being first. The application server creates a LoginContext instance by passing in the subject instance for the caller principal and a CallbackHandler instance. Next, the application server calls the login method on the LoginContext instance.

The principal mapping module takes a subject instance with a caller principal and returns a subject instance with a valid resource principal and authentication data for Kerberos based authentication. The principal mapping module does not authenticate the resource principal; it just does principal mapping to find the mapped resource principal and its authentication data. The Kerberos module (called after the principal mapping module) uses the resource principal and its authentication data to authenticate resource principal. The Kerberos module uses the CallbackHandler mechanism to get necessary information (as required for getting a service ticket) about the target EIS instance from the application server. After a successful Kerberos authentication, the resource principal has Kerberos credential with a valid TGT and service ticket for the EIS instance. The Kerberos credential is represented through the GenericCredential interface. The application server calls the method ManagedConnectionFactory.create-ManagedConnection passing in a subject instance with the resource principal and its Kerberos credential. The remaining steps are the same as in the previous scenario.

Figure 10:
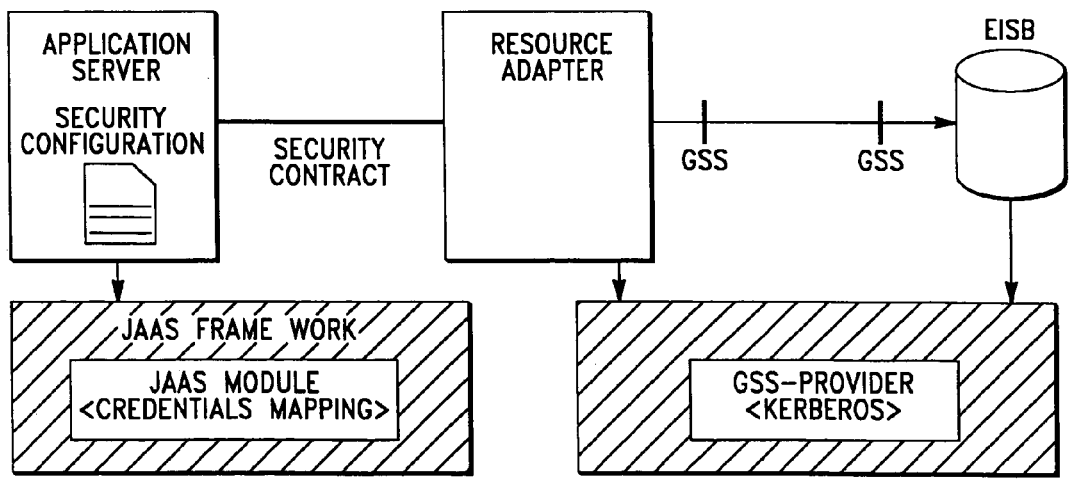

Directing attention to FIG. 10, a credential mapping scenario involves the following steps. The caller principal has been authenticated and has public key certificate based credential. The security environment for the target EIS instance is configured with Kerberos authentication service. The application server is configured with a credential mapping module that maps the publicly certificate based credential associated with the caller principal to Kerberos credential for the resource principal. The mapped resource principal has the same identity as the caller principal. The application server calls the configured credential mapping module to perform credentials mapping. The application server calls LoginContext.login method passing in a Subject instance corresponding to the initiating principal and a CallbackHandler instance.

The CallbackHandler enables mapping module to get any application server provided authentication data and EIS instance specific information. The mapping module maps the public key certificate based credential for the caller principal to Kerberosbased credential. To achieve this mapping, the module uses the authentication data and EIS specific information either carried as part of the subject instance or acquired through the JAAS callback mechanism. After a successful credential mapping, the caller principal (now mapped to a resource principal) has Kerberos credential with a valid TGT and service ticket for the EIS instance. The Kerberos credential is represented through the GenericCredential interface. The application server calls the method ManagedConnectionFactory.create-ManagedConnection passing in a Subject instance with the resource principal and its mapped Kerberos credential. The resource adapter creates a new physical connection to the EIS using Kerberos credential for the resource principal. This step is illustrated in the previous scenario.

Figure 11:
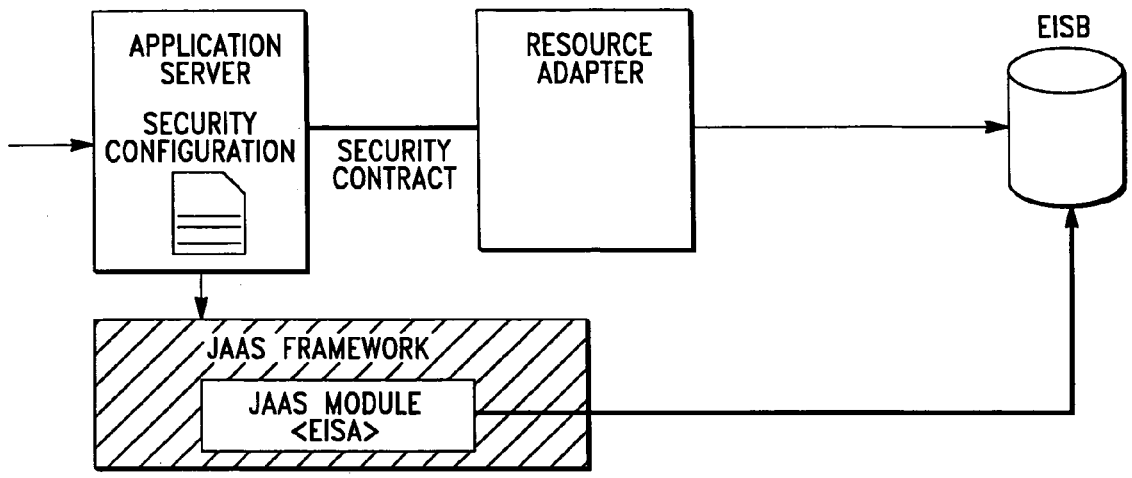

Directing attention to FIG. 11, authentication may be performed though an EIS specific JAAS module. This scenario involves the following steps. During the configuration of a resource adapter, the application server is configured to use an EIS specific JAAS module for authentication to the underlying EIS. The configured JAAS module supports an authentication mechanism specific to the EIS. The application server takes the responsibility of managing the authentication data and JAAS configuration. The application server gets a request from the application component to create a new physical connection to the EIS. The creation of a new physical connection requires the resource principal to authenticate itself to the underlying EIS instance. The application server initiates the authentication of the resource principal. It creates a LoginContext instance by passing in the Subject instance and a CallbackHandler instance.

Next, the application server calls the login method on the LoginContext instance. The JAAS module authenticates the resource principal to the underlying EIS. It uses the callback handler provided by the application server to get the authentication data. The application server invokes the method ManagedConnectionFactory. createManagedConnection passing in the subject instance with the authenticated resource principal and its credential. The resource adapter extracts the credential (associated with the subject instance) for the resource principal using the methods defined on the Subject interface. The resource adapter uses these credential to create a connection to the underlying EIS. In this scenario, authentication of a resource principal (as initiated by the application server and performed by the JAAS module) is separated from the creation of a connection to the EIS. The resource adapter uses the credential of the resource principal to create a connection to the EIS. This connection creation can involve further authentication. After a successful creation of a connection to the EIS, the resource adapter returns the newly created connection from the method Managed-ConnectionFactory.create-ManagedConnection.

Figure 12:
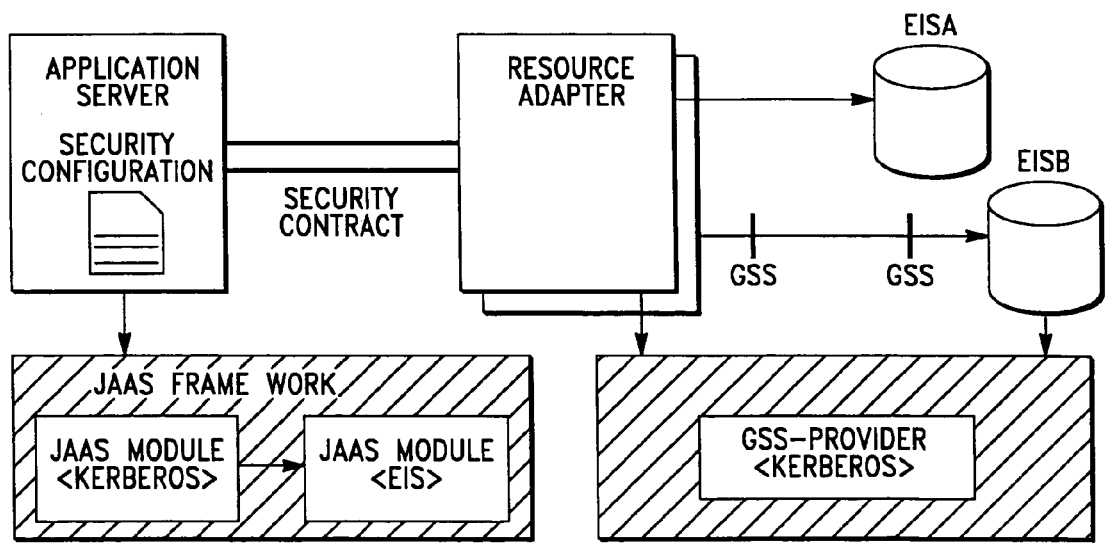

Directing attention to FIG. 12, JAAS enables an application server to manage single sign on across multiple EIS instances. The system administrator can configure various JAAS modules such that they can share security information with one another. When a single Subject is mapped to different user names and passwords for each EIS, the JAAS modules can coordinate to map application server provided security information into the relevant EISspecific information. For example, the application server provides a single username and password. This security information gets mapped into the respective EIS specific user names and passwords. This enables a single subject to authenticate to multiple EISs. Since JAAS supports the ability to associate credentials for multiple security mechanisms with a subject instance, the application server can access credentials for a subject and authenticate the subject to additional EISs. Since a credential contains the necessary information for further authentication, the Subject instance is not required to provide any new security information.

While a security architecture for integration of an enterprise information system with a Java 2 Enterprise Edition platform has been described and illustrated in detail, it is to be understood that various modifications and changes may be made to the embodiments without departing from the spirit of the invention.

What is claimed is:

1. A method of providing security in a computer system having a client, an application server, an application component, a resource adapter and a principal mapping module, and a subject instance having the method comprising the steps of:

invoking a connection request method by the application component on the resource adapter without passing in any security arguments;

the resource adapter passes the connection request to the application server via a connection factory;

the application server is configured to use the principal mapping module such that the principal mapping module takes the subject instance with a caller principal and returns the subject instance with a valid resource principal and password credential instance to the application server; and an enterprise establishing a managed connection between the application server and the enterprise information system using the valid resource principal and password credential instance generated by the principle mapping module.

2. The method of claim 1, wherein said security includes a security context that contains support for Java authentication and authorization service based pluggable authentication.

3. The method of claim 1, further comprising a generic credential interface.

4. The method of claim 1, further comprising a security principal interface.

5. The method of claim 1, wherein the managed connection includes a security contract data structure including:

a subject class;

a generic credential interface;

a password credential interface; and a java security principal interface.

6. The method of claim 1, wherein the security is propagated from said application server to the resource adapter.

* * * * *